United States Patent [19]

Dalrymple

[11] Patent Number: 5,625,842
[45] Date of Patent: Apr. 29, 1997

[54] SYSTEM FOR THE AUTOMATIC TRANSFER OF MESSAGE STATUS IN DIGITAL DATA COMMUNICATION

[75] Inventor: Monte J. Dalrymple, Fremont, Calif.

[73] Assignee: Zilog, Inc., Campbell, Calif.

[21] Appl. No.: 214,019

[22] Filed: Mar. 15, 1994

Related U.S. Application Data

[63] Continuation of Ser. No. 625,648, Dec. 7, 1990, abandoned, which is a continuation of Ser. No. 195,215, May 18, 1988, abandoned.

[51] Int. Cl.[6] .................................................. G06F 12/00
[52] U.S. Cl. ............................................................. 395/842
[58] Field of Search ........................ 364/DIG. 1, DIG. 2; 395/200, 400, 425, 842

[56] References Cited

U.S. PATENT DOCUMENTS

| | | | |
|---|---|---|---|
| 4,242,750 | 12/1980 | Finck et al. ................................ | 371/22 |
| 4,403,282 | 9/1983 | Holberger et al. ...................... | 364/200 |
| 4,511,969 | 4/1985 | Koenig et al. ............................ | 364/200 |
| 4,542,457 | 9/1985 | Mortensen et al. ...................... | 395/200 |
| 4,562,533 | 12/1985 | Hodel et al. .............................. | 364/200 |
| 4,639,863 | 1/1987 | Harrison et al. .......................... | 364/200 |
| 4,644,463 | 2/1987 | Hotchkin et al. ......................... | 395/250 |
| 4,646,261 | 2/1987 | Ng ............................................. | 364/900 |
| 4,698,628 | 10/1987 | Herkert et al. ........................... | 340/825.02 |
| 4,703,449 | 10/1987 | Berman .................................... | 395/872 |
| 4,716,522 | 12/1987 | Funabashi et al. ....................... | 395/250 |
| 4,801,934 | 1/1989 | Herkert .................................... | 340/825.02 |
| 4,847,750 | 7/1989 | Daniel ...................................... | 395/294 |
| 4,882,702 | 11/1989 | Struger et al. ........................... | 395/200 |
| 4,888,691 | 12/1989 | George et al. ............................ | 364/300 |

*Primary Examiner*—Thomas G. Black
*Assistant Examiner*—Maria N. Von Buhr
*Attorney, Agent, or Firm*—Majestic, Parsons, Siebert & Hsue

[57] ABSTRACT

A device for automatic transfer of status information concerning data blocks between a microprocessor controlled system and a peripheral device where a direct memory access controller (DMA) is used for transferring data. The status information concerning a certain data block is stored in status registers where the status information is received from either the microprocessor controlled system or the peripheral device. The DMA controls the transfer of data between the two systems where the blocks of data are stored in a FIFO. Each data block contains at its end an end of data indicator. A state machine and counter responds to the end of data indicator of a data block upon the completion of the transfer of the data block to generate an enabling signal for transferring the status information from the register as if it were part of the data block. This is performed in a manner transparent to the DMA and the microprocessor to obviate the need of microprocessor intervention.

10 Claims, 11 Drawing Sheets

| RSBL1 | RSEL0 | INTERPRETATION |
|---|---|---|
| 0 | 0 | NO STATUS |
| 0 | 1 | STATUS 0 ONLY (SHORT) |
| 1 | 0 | STATUS 0 AND STATUS 1 (LONG) |
| 1 | 1 | ------- |

*FIG. 2B.*

| TSBL1 | TSBL0 | INTERPRETATION |
|---|---|---|
| 0 | 0 | NO STATUS |
| 0 | 1 | STATUS 0 ONLY (SHORT) |
| 1 | 0 | STATUS 0 AND STATUS 1 (LONG) |
| 1 | 1 | ------- |

| WORD/BYTE* | RSBC2 | RSBC1 | RSBC0 | INTERPRETATION |
|---|---|---|---|---|
| X | X | X | X | DATA DECODE H, L TO READ DATA H, L ENABLES RESPECTIVELY |
| 0 | 0 | 0 | 0 | DATA DECODE L TO READ STATUS 0 L ENABLE |
| 1 | 0 | 1 | 0 | DATA DECODE L TO READ STATUS 0 H, L ENABLE |
| X | 0 | 1 | 1 | DATA DECODE L TO READ STATUS 0 H ENABLE |
| 0 | 1 | 0 | X | DATA DECODE L TO READ STATUS 1 L ENABLE |
| 1 | 1 | 0 | X | DATA DECODE L TO READ STATUS 1 H, L ENABLE |
| 0 | 1 | 1 | X | DATA DECODE L TO READ STATUS 1 H ENABLE |
| X | X | X | X | STATUS 0L DECODE TO READ STATUS 0L ENABLE |
| X | X | X | X | STATUS 0H DECODE TO READ STATUS 0H ENABLE |
| X | X | X | X | STATUS 1L DECODE TO READ STATUS 1L ENABLE |
| X | X | X | X | STATUS 1H DECODE TO READ STATUS 1H ENABLE |

*FIG. 2D.*

| WORD/BYTE* | TSBC2 | TSBC1 | TSBC0 | INTERPRETATION |
|---|---|---|---|---|
| X | X | X | X | DATA DECODE H, L TO WRITE DATA H, L ENABLES RESPECTIVELY |
| 0 | 0 | 0 | 0 | DATA DECODE L TO WRITE STATUS 0 L ENABLE |
| 1 | 0 | 1 | 0 | DATA DECODE L TO WRITE STATUS 0 H, L ENABLE |
| X | 0 | 1 | 1 | DATA DECODE L TO WRITE STATUS 0 H ENABLE |
| 0 | 1 | 0 | X | DATA DECODE L TO WRITE STATUS 1 L ENABLE |
| 1 | 1 | 0 | X | DATA DECODE L TO WRITE STATUS 1 H, L ENABLE |
| 0 | 1 | 1 | X | DATA DECODE L TO WRITE STATUS 1 H ENABLE |
| X | X | X | X | STATUS 0L DECODE TO WRITE STATUS 0L ENABLE |
| X | X | X | X | STATUS 0H DECODE TO WRITE STATUS 0H ENABLE |
| X | X | X | X | STATUS 1L DECODE TO WRITE STATUS 1L ENABLE |
| X | X | X | X | STATUS 1H DECODE TO WRITE STATUS 1H ENABLE |

| TSBC2 | TSBC1 | TSBC0 | |
|---|---|---|---|
| 0 | 0 | 0 | DATA |
| 0 | 0 | 1 | |
| 0 | 1 | 0 | FIRST ONE OR TWO BYTES OF STATUS |
| 0 | 1 | 1 | SECOND BYTE OF STATUS |
| 1 | 0 | 0 | THIRD OR THIRD AND FOURTH BYTES OF STATUS |
| 1 | 0 | 1 | THIRD OR THIRD AND FOURTH BYTES OF STATUS |
| 1 | 1 | 0 | FOURTH BYTE OF STATUS |
| 1 | 1 | 1 | FOURTH BYTE OF STATUS |

SYSTEM FOR THE AUTOMATIC TRANSFER OF MESSAGE STATUS IN DIGITAL DATA COMMUNICATION

This is a continuation of application Ser. No. 07/625,648, filed Dec. 7, 1990, now abandoned, which is a continuation of application Ser. No. 195,215, filed May 18, 1988, now abandoned.

BACKGROUND OF THE INVENTION

This invention relates in general to digital data communication, and in particular to the transfer of status information related to messages transferred between two systems, such as a microprocessor system and a peripheral integrated circuit chip.

For communication between the microprocessor and a peripheral device such as a modem, a printer or a data acquisition instrument, it is often expedient for digital data to be carried in a single line connecting them. In order to do this, the parallel data from the microprocessor must be converted to a serial bit stream for transmission over the line. Similarly, serial data received from a line must be converted to parallel form before the microprocessor can process it. In typical applications, an integrated circuit peripheral chip is used to convert digital data between parallel and serial forms.

The digital message to be transferred consists of two types of information. The first type, which forms the bulk of the information, is a continuous block of data, also referred to as a frame of data. The second type is one or more words of status information containing the status of the block of data, generated either by hardware logic of the peripheral chip or the program logic of the microprocessor system. This status information is usually stored in status registers within the peripheral chip.

In the receive case, serial data enters the peripheral chip and emerges as parallel data to be written to the system memory. Should errors arise from the reception of the serial data, they would be so indicated by having one or more bits of the status registers set by the peripheral chip. After the frame of data has been transferred from the peripheral chip to the system memory, typically, the microprocessor would fetch the status information before it is overwritten by the status information on the next block of data entering the receiver.

In the transmit case, where parallel data from the system memory enters the peripheral chip and emerges as a serial data stream to an external device, the status information precedes the data block and is programmably set by the microprocessor to instruct the peripheral chip what action to take in the event of error conditions.

In either case, the status registers also carry, among other things, other information related to the format of the message such as message length, last character length and message termination type.

In high performance peripheral chips, the contiguous block of data is most efficiently transferred between the peripheral chip and the system memory under the control of a Direct Memory Access Controller (DMA). This obviates the need for the microprocessor's processing of the data transfer. However, the microprocessor's attention is still required for the transfer of the status information. Moreover, the timing is critical. In the receive case, action by the microprocessor is required to read the status information before a new message enters the peripheral chip. In the transmit case, the status information must be written before the transmission of the message itself. Furthermore, after the transmission of one message has been completed, the microprocessor must first write the status information for the next message into the status register before the transmission of the next message can begin; this again requires microprocessor intervention at critical times. The need for prompt microprocessor intervention during certain phases of the transmission process between the microprocessor system and the peripheral compromises the performance of the overall system.

Accordingly, it is a primary object of the invention to provide an improved peripheral chip which does not require microprocessor intervention for the transfer of status information.

It is another important object of the invention to have the status information transferred under the control of a DMA in such a way that status information and message information are transferred within the same block.

SUMMARY OF THE INVENTION

In digital data communication between two systems, such as between a microprocessor system and a peripheral device, a controller such as a DMA is frequently used for transferring data without microprocessor intervention. This invention is based on the observation that, by employing an end of data indicator at the end of each data block, and employing a device which responds to the indicator and cooperates with the DMA so that the status information is also treated as data by the DMA, time critical microprocessor intervention otherwise necessary for transferring status information upon completion of a data block transfer is avoided entirely. In other words, the hardware already present is utilized for transferring status information to avoid wasteful microprocessor intervention. The invention is of course equally applicable where a controller or a co-processor other than a DMA is used to control the transfer of data.

The apparatus of this invention is directed towards a device for use with a first system controlled by a microprocessor where the first system is in communication with a second system through a bus. The first system includes a controller, such as a DMA controller, for controlling the transfer of blocks of data between the two systems. A block of status information concerning a data block is also to be transferred together with the data block. The device of this invention cooperates with the controller for transferring blocks of status information and data. The device comprises a first storing means for storing blocks of data received from one of the two systems. Each block contains at its end an end of data indicator. The device also comprises a second storing means for storing a block of status information each related to a corresponding block of data. The second storing means receives the block of status information from one of the two systems. The device comprises status transfer control means responsive to the end of data indicator of a data block upon the completion of transfer of the data block for controlling the transfer of a block of status information in the second storing means to the other system so that the block of status information is transferred immediately following the block of data in a manner transparent to the controller and the microprocessor.

Where the status information block should follow the data block to which it pertains in the message transfer, as in the case of the receiver in the peripheral, the above described scheme will allow the status information block to be transferred as if it were part of the data block and without microprocessor intervention. Where the status information should precede the data block, as in the case of the transmitter in the peripheral, the above described scheme will cause the status information block pertaining to the next data block to be transferred as if it were part of the present data block, again requiring no microprocessor intervention.

The various aspects of the present invention described herein are being commercially embodied in the Z16C30 CMOS Universal Serial Controller integrated circuit chip of Zilog, Inc., Campbell, Calif., assignee of the present application.

Additional objects, features and advantages of the present invention will become apparent from the following description of the preferred embodiment thereof, of, which description should be taken in conjunction with the accompanying drawings.

DETAILED DESCRIPTION OF THE PREFERRED EMBODIMENT

Figure 1:
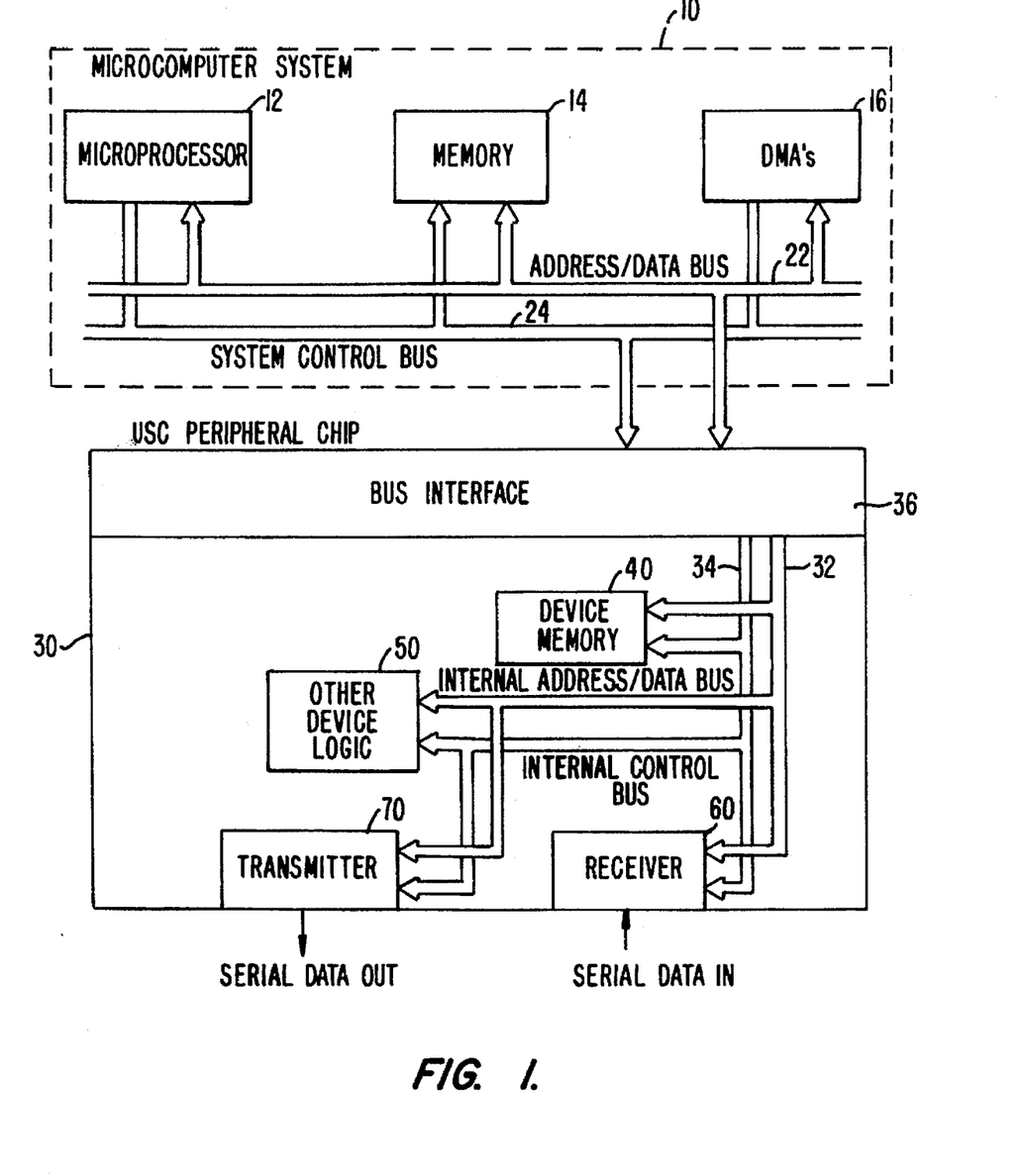
FIG. 1 is a block diagram illustrating a microprocessor system and a peripheral chip useful for illustrating the various aspects of the present invention.

A peripheral chip selected as an example to illustrate the various aspects of the present invention is the Universal Serial Controller. Before the invention is described, the digital communication environment in which the invention is useful will first be described in reference to FIG. 1. Referring to FIG. 1, the system in which the peripheral chip is used is shown in schematic block diagram form. The microcomputer system 10 comprising a microprocessor 12, a memory 14 and DMA's 16 are interconnected by the system address/data bus 22 and the system control bus 24. These two buses are also connected to the peripheral chip 30 through device bus interface 36 to communicate with the internal address/data bus 32 and control bus 34. The USC chip 30 comprises a device memory 40, other device logic 50, a receiver 60 and a transmitter 70, each represented as a functional block interconnected by internal buses 32 and 34.

The peripheral chip serves to convert between parallel data and serial data. In the receive case, the serial data enters the peripheral chip 30 through the receiver 60 and eventually gets converted to the parallel form. The parallel data is then read from the peripheral chip and written into the system memory 14 of the microcomputer system 10 via internal address/data bus 32, device bus interface 36 and system address/data bus 22. In the transmit case, parallel data in the system memory 14 of the microcomputer system 10 is written to the peripheral chip via system address/data bus 22. The parallel data finds its way to the transmitter 70 by way of internal address/data bus 32 and gets serialized and emerges as serial data.

The present invention is useful in the transfer of parallel data between the peripheral chip 30 and the system memory 14. As with any bus-oriented system, the data being shuttled on the address/data bus 22 is controlled by the microprocessor 12 or by DMA's 16 if present. Typically, read or write operations on any addressable register or memory are done by normal bus access under the control of the microprocessor. In order to perform a read or write cycle, the microprocessor's address and data registers as well as the program counter must be loaded with the new values. The microprocessor first puts out the address of the memory or register on the address bus; the address is decoded to enable the addressed register or memory for read or write. The microprocessor then makes available the data on the data bus and issues a strobe signal to latch the data from the bus onto the register or memory. These operations demand the full attention of the microprocessor to the exclusion of any other operation. Furthermore, if the microprocessor is engaged in the middle of another operation when called upon to perform a read or write cycle, it must first store away the current contents of the address and data registers as well as the program counter before loading in the new ones. In this way, the existing contents may be restored after the cycle has been completed. This obviously takes time and compromises performance.

In the case where there is a whole block of data to be transferred, it is more efficient to use a DMA to control the transfer instead of the microprocessor. In this case, the memory containing the block of data to be transferred issues a request to the DMA. The DMA then requests the control of the bus from the microprocessor, and after obtaining it, issues an acknowledgement to the memory to initiate the data transfer under its control. Due to the overheads incurred, this mode of transfer is only efficient when a block of data is transferred at a time. The above serves as a useful background for discussion of the invention.

As discussed earlier, in conventional systems, the block transfer of message data is efficiently transferred under the DMA's control while the transfer of the status information is relegated to the control of the microprocessor.

The present invention allows the status information to be regarded as if it were message data and be transferred with it in the same DMA transfer block. The differences between conventional systems and that of the preferred embodiment will be described in more detail below.

The implementation is slightly different for the receive case where the status information is transferred at the end of the message data, and for the transmit case where the status information is transferred prior to the transfer of the message data.

Figure 2A:
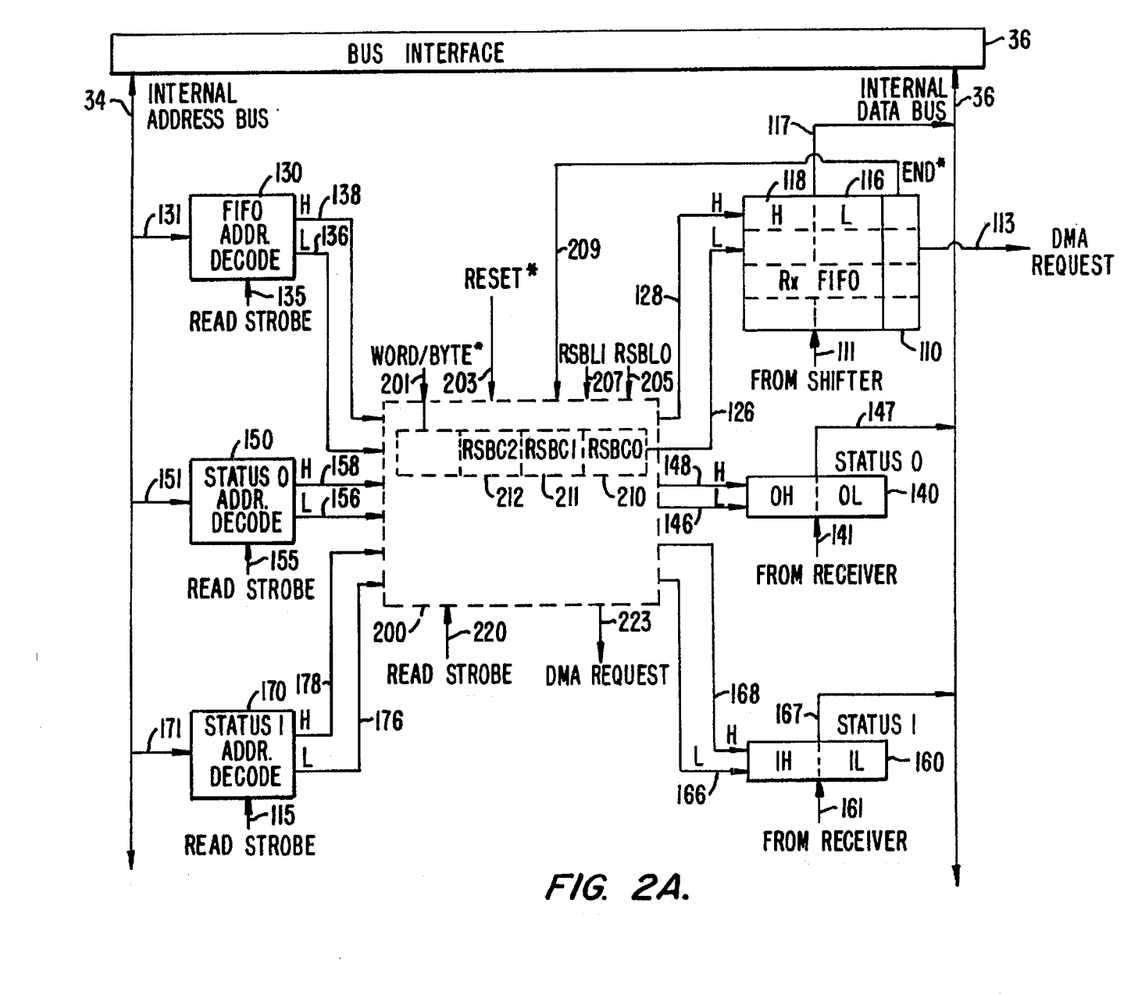
FIG. 2A is a schematic diagram illustrating the receiving portion of the chip of FIG. 1, where the portion has a data FIFO, two status registers and a functional block representing the device of the preferred embodiment in the receive case.

FIG. 2A shows the relevant portions of the USC chip under the receive case. After the serial data has entered the receiver and is converted to parallel form by a shifter, they are written into a RX FIFO 110 via lines 111. When the data in the RX FIFO 110 is filled to a predetermined level, device logic associated with the FIFO (not shown) issues a DMA request 113 to the DMA. After the DMA has assumed control of the bus from the microprocessor, it asserts acknowledgement in the form of a series of read strobes which are used to initiate transfer of data from the peripheral chip to the system memory. In order for the data from the Rx FIFO 110 to be read out, the FIFO must first be selected by program logic with a FIFO address decode 130. When decoded, the read strobe from line 135 is passed on to one or both outputs, namely data decode L 136 and data decode H 138. In the present embodiment, the FIFO 110 has a width which can accommodate two bytes of data, namely a Low byte 116 and a High byte 118. Thus, in order for the High byte or the Low byte data to be transferred out of the Rx FIFO 110, they must first be enabled respectively via a read data L enable line 126 and a read data H enable line 128; such enable signals are derived from the data decode L 136 and data decode H 138 lines.

As the receiver is sending data to the Rx FIFO 110, it is also performing checks on any possible errors which may occur prior to the data entering the receiver. If the receiver detects any error, it so indicates by setting one or more bits of one or more status registers, namely the status 0 register 140 and the status 1 register 160. Similar to the FIFO 110, the two status registers, 140 and 160, are also two-byte wide. The status 0 register 140 receives the status information from receiver via lines 141. The information is then transferred out of the register 140 whenever the corresponding Low byte is enabled via a read status 0L enable line 146 or the High byte is enabled via a read status 0H enable line 148 or both. Under these circumstances, the status 0 information is made available to internal bus 36 via lines 147.

Similarly, status 1 register 160 contains status 1 information received from receiver via lines 161 and communicates with internal bus 36 via lines 167. Its information is transferred out whenever its Low byte or High byte is enabled via a status 1L enable line 166 and a status 1H enable line 168 respectively.

In conventional systems, device 200 is absent and status registers 140, 160 are enabled only by signals from status address decoders 150, 170. In other words, when the microprocessor provides the addresses of registers 140, 160 to the bus 34, such addresses are decoded by decoders 150, 170 to enable the reading of the status information from register 140, 160. This, however, requires time critical microprocessor intervention which is undesirable. By including at the end of each data block an end of data indicator (in this case, an end* bit) and employing device 200, the system of this invention enables the status information from registers 140, 160 to be transferred without microprocessor intervention. The DMA already present is made use of in the invention to accomplish this result.

Included as the last bit in the last word of each data block is an end* bit. The status information is transferred to the system memory after all the data in the Rx FIFO 110 has been transferred. As the last word of the message exits the Rx FIFO 110, an end* bit is detected and causes the DMA request to cease. In conventional systems the DMA operation will cease and return the bus control to the microprocessor. The microprocessor then must come in to address the status 0 register 140 and the status 1 register 160 by means of status 0 address decode 150 and status 1 address decode 170 respectively, in order to transfer their contents to system memory. This must be done promptly before the next message comes in and resets the status registers.

One important feature of the present invention is to obviate the need for the microprocessor to execute the transfer of the status information. The invention takes advantage of existing hardware resources, such as the DMA interface on the device, to allow the status information to be read from or written to the device as if it were part of the message data. This makes microprocessor intervention unnecessary. In this implementation, either one or two words of status (status 0 and status 1), accessible as bytes or words, are automatically transferred to system memory. DMA requests are generated for the status information transfers identically to the DMA requests for message data.

Figure 2B:
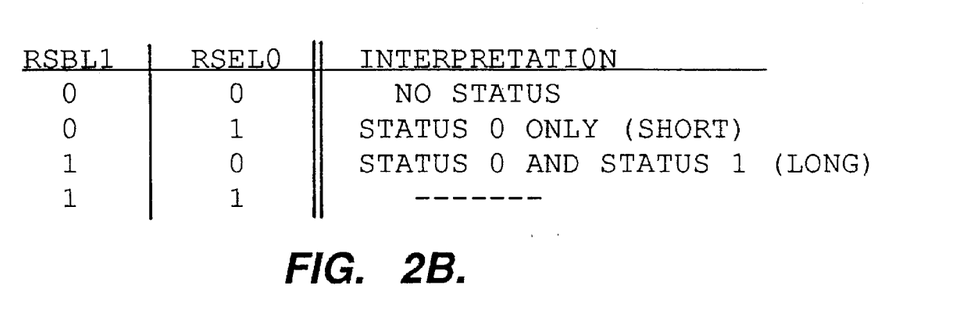
FIG. 2B shows the encoding table of the status length bits RSBL0, RSBL1 to illustrate the function of the device of FIG. 2A.

The scheme above is accomplished by a circuit 200 which is represented by a functional block in FIG. 2A. It is basically a state-dependent multiplexer driven by a state machine in response to five input parameters (shown on top of the block 200). Except for the end* bit, all of the input parameters are under microprocessor programmable control. The first one is word/byte* which is input through line 201. A Zero means that a byte is read or written at a time which is the case for an eight-bit data bus. A One means a word is read or written at a time which is usually the case for a 16-bit bus. The second input parameter is reset* which is input to circuit 200 via line 203. This is used to reset the circuit to the initial state ready for message data. The third and fourth input parameters are RSBL0 which is input via line 205 and, RSBL1 which is input via line 207. These two bits form an encoding which specifies whether no status register, one status register or both status registers are to be read. The encoding table is illustrated in FIG. 2B. The fifth and final input is the end* bit which comes from the Rx FIFO 110 and enters circuit 200 via line 209. When the last word or byte of message data emerges from the Rx FIFO 110, end* is set to zero.

The circuit 200 contains a state machine whose states are labelled by RSBC0 210, RSBC1 211 and RSBC2 212. Every time a read strobe is received via line 220, the three-bit state may remain the same or transit to a different state depending on the various input parameters and the existing state.

Figure 2C:
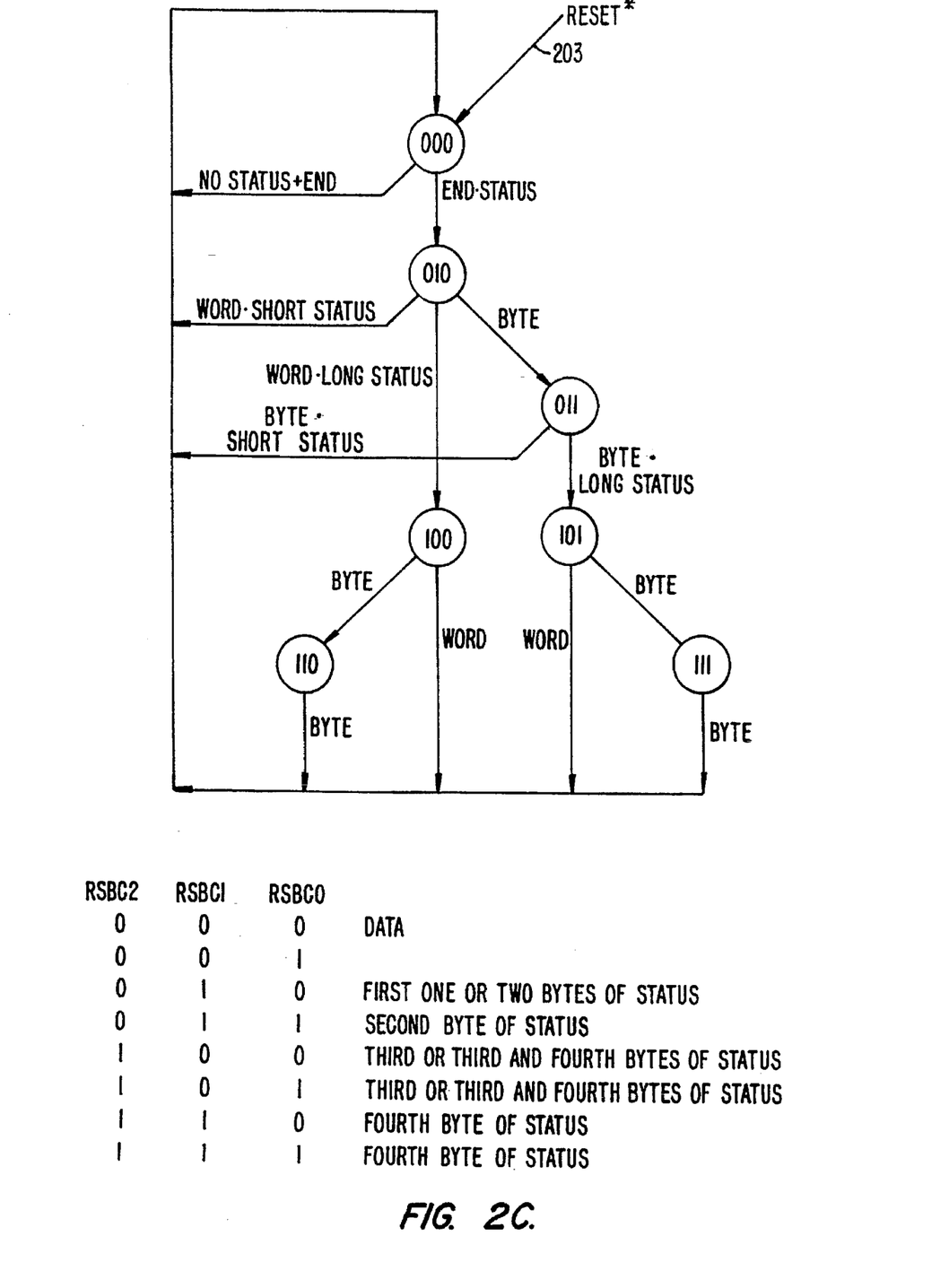
FIG. 2C shows a state diagram of the device for the receive case.

FIG. 2C illustrates the state diagram for the circuit 200 of FIG. 2A. Each state is labelled by the 3-bits RSBC2, RSBC1 and RSBC0. The state 000 specifies the normal state where message data is to be read from RX FIFO to system memory. This state can be initiated by setting reset* on line 203 to zero. At each read strobe issued by the DMA, a word or a byte of message data is written to the system memory. At the same time the read strobe is used to clock a counter within the circuit to advance the state. However, as long as the end* bit is not received, the state 000 remains the same after each read strobe.

The state 000 will transit to the state 010 when two conditions are met: (1) when all the data has been transferred from the Rx FIFO and the end* bit has been received by the circuit, and (2) when RSBL1 and RSBL0 specify that at least one status register is to be read. This means either first one or two bytes of status will be read depending on whether word/byte* is zero or one. Furthermore, if a short status is specified through values of input parameters RSBL0, RSBL1 (see FIG. 2B), the state 010 will return to the state 000 after reading a word of status, or it will transit to the state 011 after reading one byte of status and then return to the state 000 after reading another byte of status. On the other hand, if a long status is specified (see FIG. 2B), the state 010 will transit to the state 100 after reading a word of status 0 or transit to state 101 via state 011 after reading consecutively the two bytes of status 0. Similarly, the state 100 will return directly to the initial state 000 after reading a word of status 1 or indirectly through state 110 after reading consecutively the two bytes of status 1. Similar routes exist for state 101 to return to the initial state 000.

With the transition property of the states specified, we now turn our attention to the multiplexing aspect of the circuit. Referring to FIG. 2A, the circuit block 200 serves as a state dependent multiplexer which switches the set of decode lines on the left of the block onto the set of enable lines on the right. The outputs of the FIFO address decode 130 are connected to the data decode lines, namely the data decode L line 136 and the data decode H line 138. The outputs of the status 0 address decode 150 are connected to the status 0 decode lines, namely the status 0L decode line 156 and the status 0H decode line 158. The outputs of the status 1 address decode 170 are connected to the status 1 decode lines, namely the status 1L decode line 176 and the status 1H decode line 178. These six decode lines are switched by the circuit 200 onto a set of six enable lines. The enable lines, read data L enable 126 and read data H enable 128, are used respectively to enable the reading of the Low byte 116 and the High byte 118 of the Rx FIFO 110. Similarly, the lines read status 0L enable 146 and read status 0H enable 148 are used respectively to enable the reading of the Low byte 0L and the High byte 0H of status 1 register 140. Finally, the lines read status 1L enable 166 and read status 1H enable 168, are used respectively to enable the Low byte 1L and the High byte 1H of status 1 register 160.

Figure 2D:
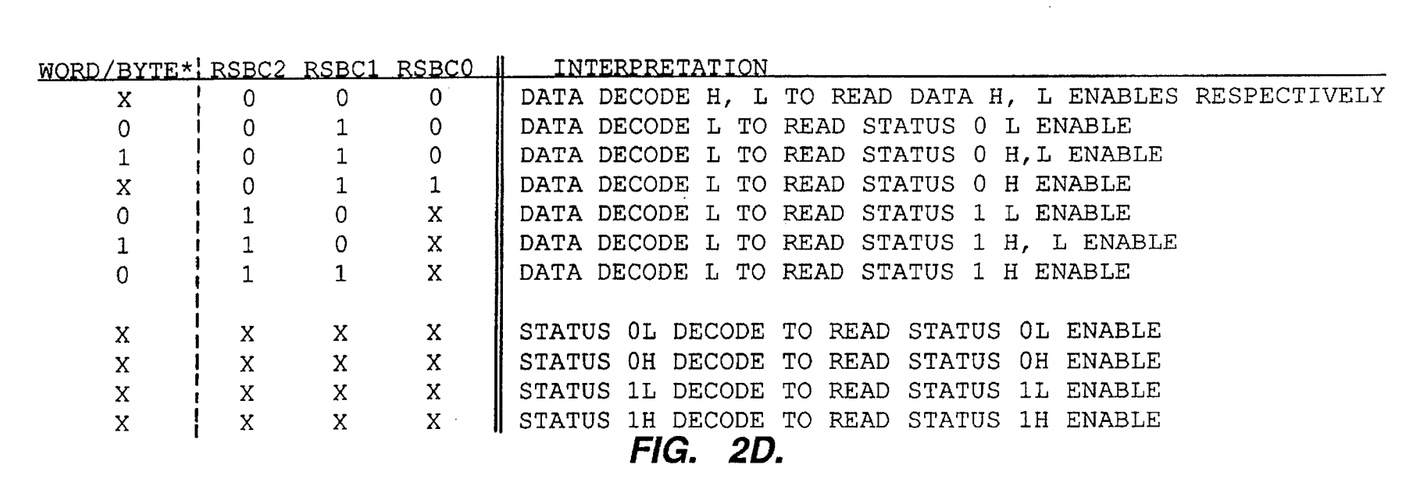
FIG. 2D is the truth table of the device in the receive case.

FIG. 2D illustrates the truth table for the routing of the decode lines entering from the left side of circuit block 200 to the read enable lines emerging from the right side. It is consistent with the state diagram of FIG. 2C and provides details of the exact routing of signals between the two sets of lines. Referring to FIG. 2A and FIG. 2D at the same time, the routing of the lines are determined by the 3-bit state given by RSBC0 210, RSBC1 211, and RSBC2 212 in conjunction with the word/byte* bit 201.

As mentioned before, state 000 is used during message data transfers out of the Rx FIFO 110. To enable that to happen, the address of the Low bit 116 and the High bit 118 must first be decoded by the FIFO address decode 130. The decoded addresses are then passed from the data decode L line 136 onto the read data L enable line 126 and the data decode H line 138 onto the read data H enable line 128 by the circuit 200.

After all the message data has been transferred out of the Rx FIFO 110, and an end* bit has been received, the state machine within circuit 200 advances to state 010 which means that status information is now to be read. Since the status information is to be read as if it was message data, FIFO address decoder 130 will still supply read enable signals, in this particular example under discussion, from the data decode L line 136. Thus in the case where the lower byte 0L of the status 0 register is to be read, the enable signal on data decode L line 136 is routed to the read status 0L enable line 146. At the same time, a DMA request 223 is issued by the circuit 200 (FIG. 2A). This replaces the DMA request 113 originally issued by the Rx FIFO 110 which has since terminated on completion of the message data transfer out of the FIFO. Thus, as far as the system and the DMA is concerned, continuity is maintained and the message data is still regarded as being transferred even though the entire data block has been transferred out of the Rx FIFO 110. Except now the "message data" really is status information which comes from the status 0 register 140 and/or the status 1 register 160. Thus, as far as the DMA is concerned, data transfer has not terminated and will continue to generate read strobe signals for transferring the status information. As another example, if the upper byte 1H of the status 1 register is to be read (this corresponds to RSBC0=0 or 1, RSBC1=1, RSBC2=2 and word/byte*=0), the data decode L line 136 would then be routed to the read status 1H enable line 168.

Figure 2E:
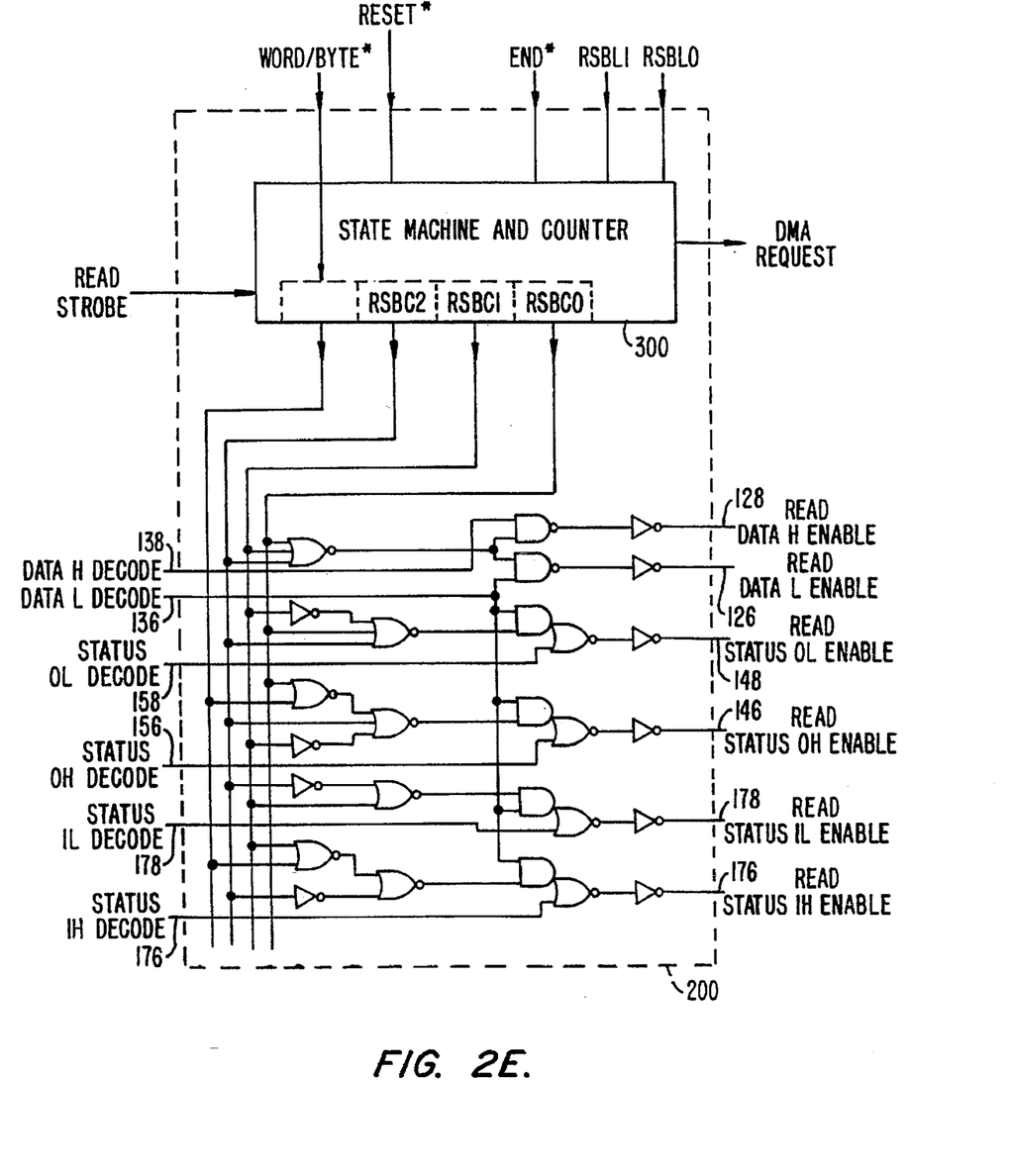
FIG. 2E shows combinational logic which satisfies the truth table of FIG. 2D and is schematically being driven by a state machine and counter.

FIG. 2E shows the circuit block 200 in more detail. It comprises a state machine and counter 300 whose 3-bit state, RSBC0, RSBC1, and RSBC2 in conjunction with the word/byte* line is used to drive a combinational logic which routes the various decode lines onto the read enable lines. The combinational logic is a circuit realization of the truth table shown in FIG. 2D.

It will be noted from the circuit of FIG. 2E that when the microprocessor provides the addresses of registers 140, 160 on bus 34 so that decoders 150, 170 provide enable signals, device 200 will have no effect on such enabling of registers 140, 160 irrespective of the states of the state machine and counter 300. In other words, when device 200 is not used, device 200 is transparent to the microprocessor and peripheral systems. Thus, as shown in FIG. 2E, the status 0L decode line 158 is connected to the read status 0L enable line 148 and, the status 0H decode line 156 is connected to the read status 0H enable line 146. Similar connections exist for status 1 address decode 170.

According to the present invention, the status information is transferred by the DMA as if it were message data. Thus, the normally used status 0 address decode 150 and the status 1 address decode 170 are no longer needed for the transfer of the status information. However, the routing of the circuit 200 is such that the option is left open for status 0 register 140 and status 1 register 160 to be addressable by the microprocessor via the status zero address decode 150 and the status one address decode 170 respectively.

Figure 2F:
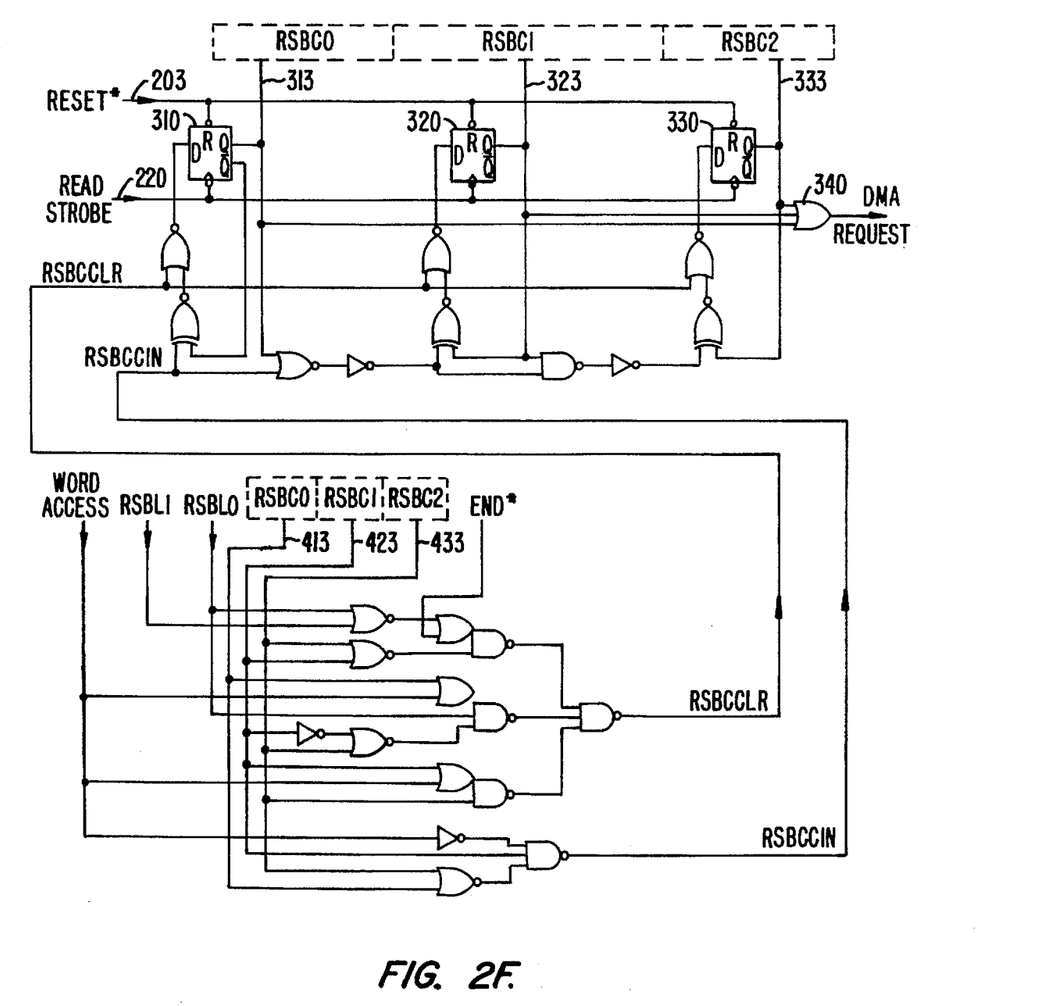
FIG. 2F is a circuit realization of the state machine and counter of FIG. 2E and which satisfies the state diagram of FIG. 2C.

FIG. 2F shows the detail circuit of the state machine and counter 300. This circuit satisfies the state diagram of FIG. 2C. The 3-bit state given by RSBC0, RSBC1, and RSBC2 is given by the outputs of the flip-flops 310, 320 and 330. These three flip-flops also act as a counter which is clocked by the read strobe from line 220. The reset* line 203 is used to reset the state to 000 whenever a zero is asserted on the line. An OR gate 340 which takes its input from the 3-bit state generates a DMA request whenever the state departs from 000 as required. The circuit 300 as a whole is a sequential logic block where the transition to another state depends on the input parameters as well as the current state. The lines 413, 423 and 433 are connected (not shown in FIG. 2F) to the lines 313, 323 and 333 respectively.

We now turn to the transmit case where the status information is first transferred from the system memory to the status registers before the message data is transferred to the transmit FIFO.

The embodiment of the invention in the transmit case is similar to the receive case in that the status information and the message data are both carried in the same DMA transfer block. However, in the transmit case, the order is reversed, and the the status information is transferred first, followed by the message data. This is accomplished by providing two reset signals, namely (reset.status)* and (reset.no status)*, which force the state of the device as explained below in detail.

FIG. 3A–3F are the counterparts in the transmit case to that of FIG. 2A–2F in the receive case.

Figure 3A:
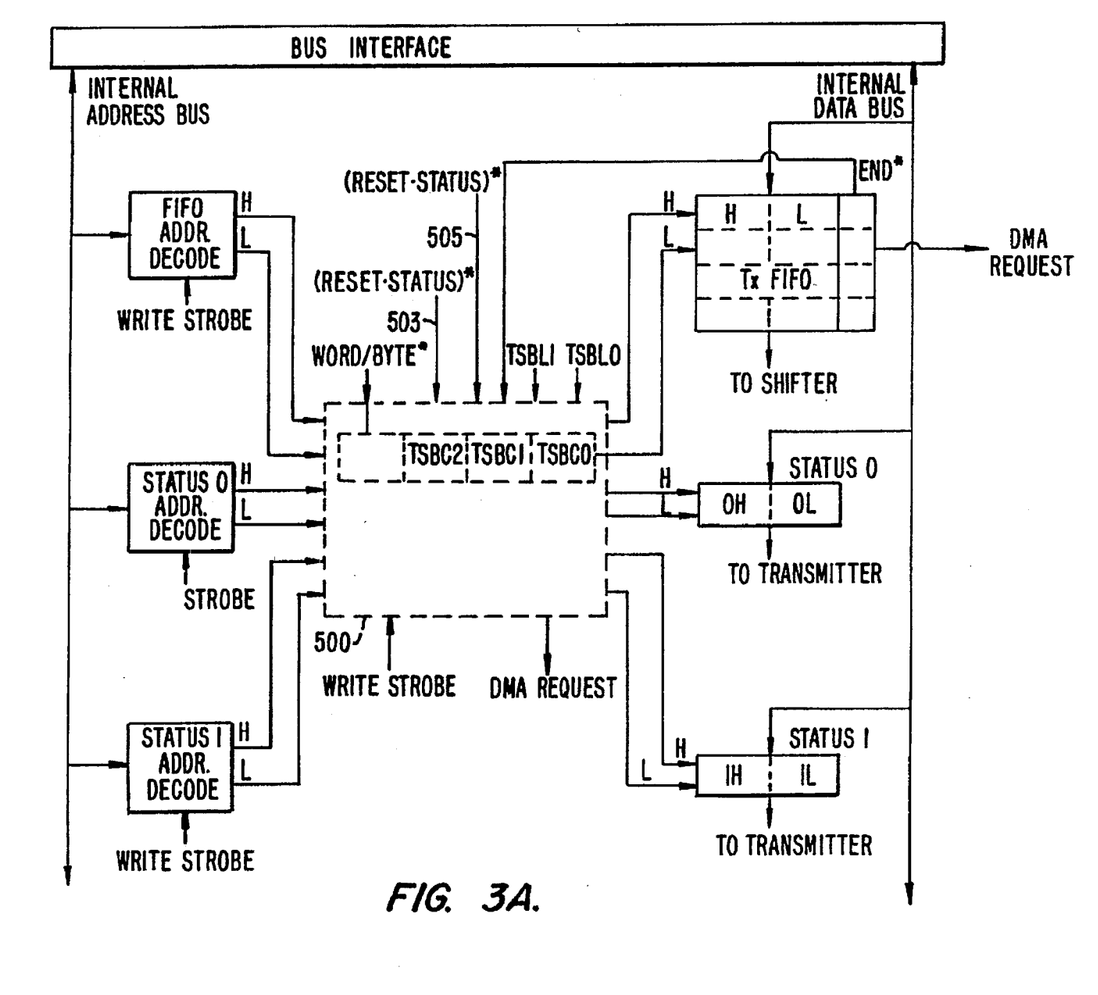
FIG. 3A is a schematic diagram illustrating the transmitting portion of the chip of FIG. 1, where the portion has a data FIFO, two status registers and a functional block representing the device of the preferred embodiment in the transmit case.

FIG. 3A is a schematic diagram illustrating the transmitting portion of the peripheral chip having a data FIFO (Tx FIFO), two status registers (status 0 and status 1) and a functional block 500 representing the device of the preferred embodiment in the transmit case. FIG. 3A is essentially the same as FIG. 2A. They differ in that the data transfer directions for the Tx FIFO, the status 0 and status 1 registers are reversed. Also the circuit block 500 has an extra input, namely (reset.status)* 505 from the microprocessor in addition to the input, (reset.no status)* 503 which corresponds to the input reset* on line 203 of the receive case. Other differences are those of nomenclature: the two encoding bits for status length are labelled as TSBL0 and TSBL1; the 3-bit state is labelled by TSBC0, TSBC1 AND TSBC2; the enable lines are labelled as write enable lines; and the strobe signal is now referred to as the write strobe.

Figure 3B:
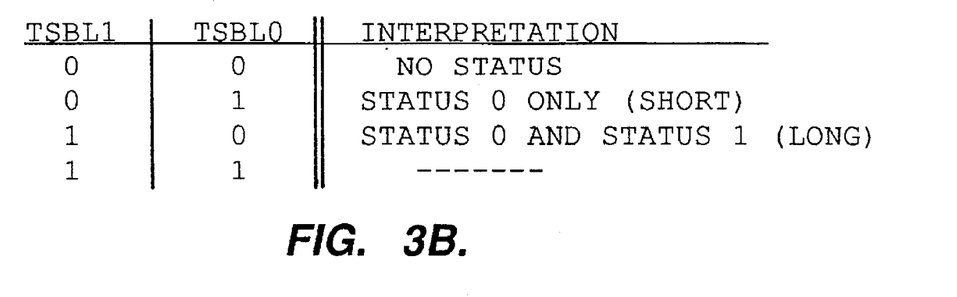
FIG. 3B shows the encoding table of the status length bits, TSBL0, TSBL1 to illustrate the function of the device of FIG. 3A.

FIG. 3B shows the encoding table of the status length bits, TSBL0 and TSBL1. It is also identical to the corresponding FIG. 2B allowing for the nomenclature change.

Figure 3C:
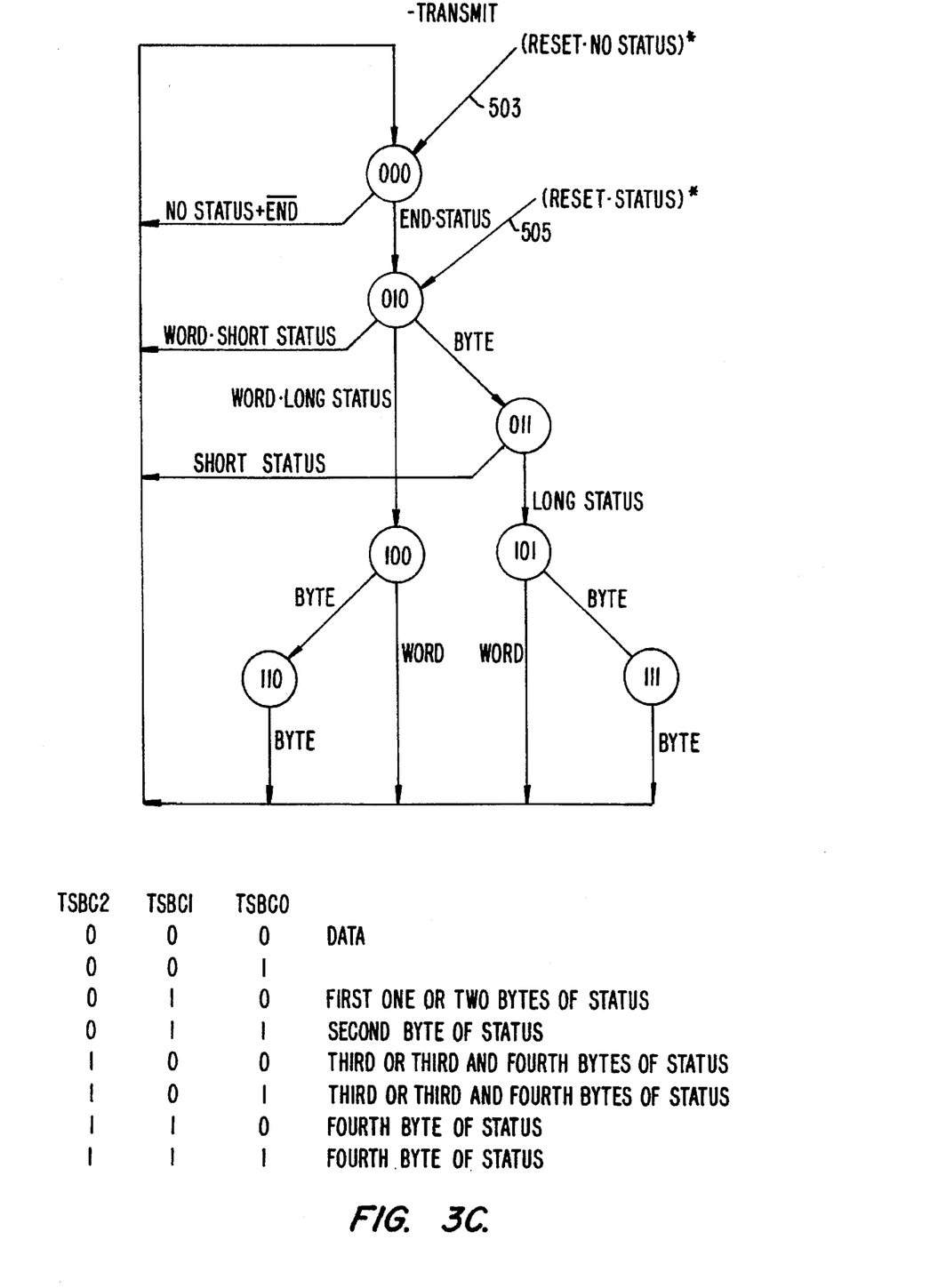
FIG. 3C shows a state diagram of the device in the transmit case.

FIG. 3C shows the corresponding state diagram of the device in the transmit case. It is essentially the same as the one shown in FIG. 2C except now the initial status state 010 can be entered into by asserting the (Reset.status)* line 505. As explained earlier, in the transmit case, the status information must be transferred before the message data. This is accomplished by asserting the (reset.status)* line to enter into the status state 010. The transfer of the status information proceeds as in the receive case, only this time the information is transferred from the system memory to the status registers. After all the specified status information has been transferred, the device enters into state 000 which is the normal state for transferring message data from the system memory to the Tx FIFO.

Figure 3D:
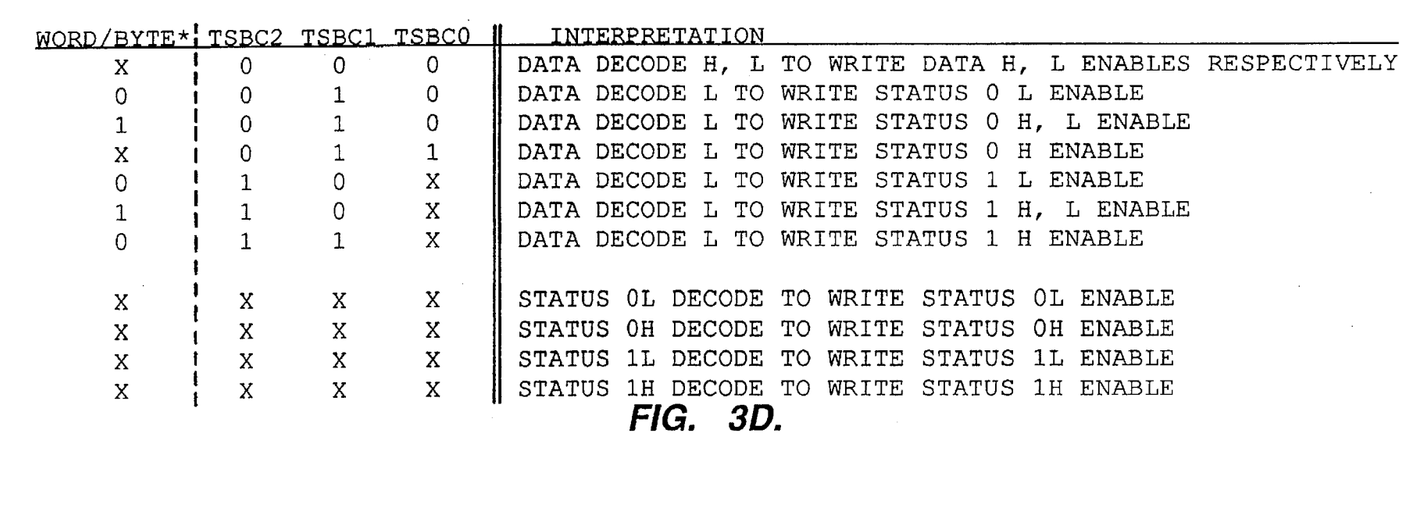
FIG. 3D is the truth table for the device in the transmit case.

FIG. 3D is the truth table for the device in the transmit case. Again, it is identical to the corresponding FIG. 2D execpt for the change in nomenclature.

Figure 3E:
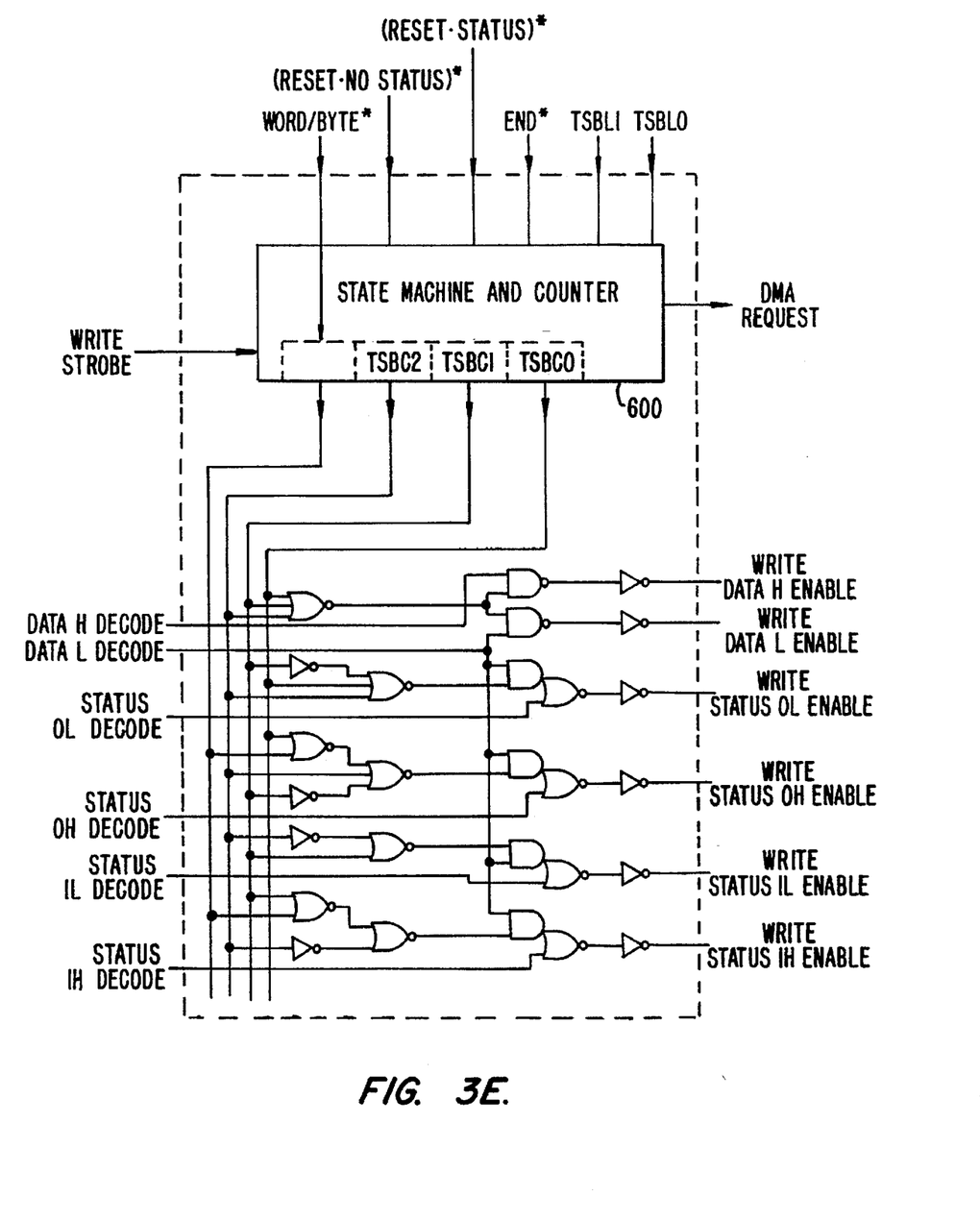
FIG. 3E shows combinational logic which satisfies the truth table of FIG. 3D and is schematically being driven by a state machine and counter.

FIG. 3E shows a combinational logic which is a circuit realization of the truth table given in FIG. 3D. It is identical in structure to the corresponding one for the receive case shown in FIG. 2E. The combinational logic is driven by a state machine and counter 600, similar to the receive case.

Figure 3F:
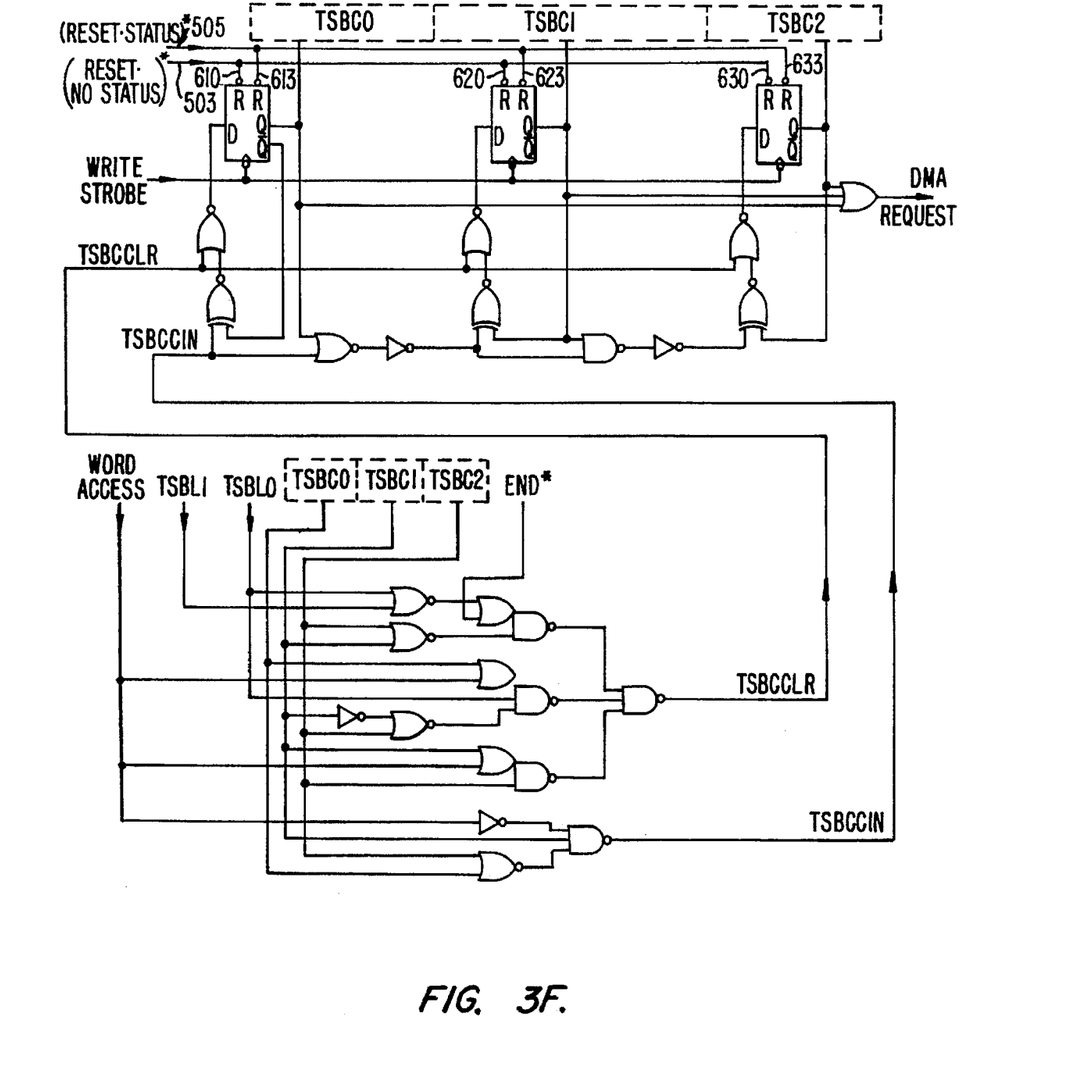
FIG. 3F is a circuit realization of the state machine and counter of FIG. 3E and which satisfies the state diagram of FIG. 3C.

FIG. 3F is a circuit realization of the state machine and counter 600 shown in FIG. 3E and which conforms to the state diagram of FIG. 3C. It is identical to the corresponding one for the receive case shown in FIG. 2F, except for the additional provision of the (reset.status)* line 505 at the counterpart of the circuit. The three flip-flops, 610, 620 and 630 form at their outputs a 3-bit state TSBC0, TSBC1 and TSBC2. Corresponding to the receive case, a (reset.no status)* line 503 is connected to each of the reset input of the flip-flops so that when the line 503 is asserted, the state is reset to 000. The additional (reset.status)* line 505 is connected to the reset inputs, 613, 633 of the flip-flops 610 and 630, and to the set input 623 of the flip-flop 620. Thus, when the line 505 is asserted, the state is reset to 010 as required.

While various aspects of the present invention have been described in reference to a microprocessor system in communication with a peripheral chip, it will be understood that the device of this invention may be used with any two systems in communication through a bus where one of the systems is controlled by a microprocessor and one of the systems includes a controller for controlling the transfer of data blocks between the two systems. Variations in the details of implementation and methods to accomplish the same function and result are within the scope of the invention, it being understood that the invention is to be protected within the scope of the appended claims.

I claim:

1. In a microcomputer system in communication with a peripheral, said microcomputer system including a microprocessor, a DMA controller, a main memory, and a bus, an interfacing device coupled to the bus for interfacing between the microcomputer system and the peripheral comprising:

a first storing means for buffering a data block being transferred between the microcomputer system and the peripheral;

a second storing means for buffering the associated status information between the microcomputer system and the peripheral;

transfer control means for combining both the data block buffered through the first storage means and the associated status information buffered through the second storing means to be transferred as a block to or from the main memory in a predetermined sequence by the DMA controller within one DMA transfer cycle;

a first generating means for generating a first DMA request for the DMA controller to transfer the data block; and a second generating means for generating a second DMA request for the DMA controller to transfer the associated status information.

2. An interfacing device as in claim 1, wherein the main memory is receiving the data block from the interfacing device and the associated status information is received as an appendage to the data block.

3. An interfacing device as in claim 2, wherein the data block has its end indicated by a demarcation thereat and said second generating means begins generating a DMA request when the demarcation at the end of the data block is detected at the first storing means.

4. An interfacing device as in claim 1, wherein the main memory is transmitting the data block to the interfacing device and the associated status information is transmitted as a precursor to the data block.

5. An interfacing device as in claim 4, wherein said second generating means begins generating a DMA request when prompted by the microcomputer system to effect transmission of the associated status information as a precursor to the data block from the main memory to the interfacing device, and said first generating means begins generating a DMA request upon an end transmission of the associated status information to effect transmission of the data block from the main memory to the interfacing device.

6. In a microcomputer system in communication with a peripheral, said microcomputer system including a microprocessor, a DMA controller, a main memory, and a bus, an interfacing device coupled to the bus for interfacing between the microcomputer system and the peripheral, comprising:

a first storing means for buffering a data block being transferred between the microcomputer system and the peripheral;

a second storing means for buffering the associated status information being transferred between the microcomputer system and the peripheral;

transfer control means for selectively coupling the first storage means and the second storing means to the bus in a predetermined sequence, and combining the data block buffered through the first storing means and the associated status information buffered through the second storing means to be transferred as a block to or from the main memory in a predetermined sequence by the DMA controller within one DMA transfer cycle;

a first generating means for generating a first DMA request for the DMA controller to transfer the data block; and a second generating means for generating a second DMA request for the DMA controller to transfer the associated status information, thereby enabling transfer of both the data block and the associated status information within the same DMA transfer cycle.

7. An interfacing device as in claim 6, wherein the main memory is receiving the data block from the interfacing device and the associated status information is received as an appendage to the data block.

8. An interfacing device as in claim 7, wherein the data block has its end indicated by a demarcation thereat and said second generating means begins generating a DMA request when the demarcation at the end of the data block is detected at the first storing means.

9. An interfacing device as in claim 6, wherein the main memory is transmitting the data block to the interfacing device and the associated status information is transmitted as a precursor to the data block.

10. An interfacing device as in claim 9, wherein said second generating means begins generating a DMA request when prompted by the microcomputer system to effect transmission of the associated status information as a precursor to the data block from the main memory to the interfacing device, and said first generating means begins generating a DA request upon an end transmission of the associated status information to effect transmission of the data block from the main memory to the interfacing device.

* * * * *

UNITED STATES PATENT AND TRADEMARK OFFICE
CERTIFICATE OF CORRECTION

PATENT NO. : 5,625,842
DATED : April 29, 1997
INVENTOR(S) : Monte J. Dalrymple

It is certified that error appears in the above-indentified patent and that said Letters Patent is hereby corrected as shown below:

In Column 10, line 23, Claim 1:
   replace "buffered through the first storage means and the associated" with:

--buffered through the first storing means and the associated--

In Column 11, line 2, Claim 6:
   replace "storage means and the second storing means to the bus" with:

--storing means and the second storing means to the bus--

Signed and Sealed this

Tenth Day of February, 1998

Attest:

BRUCE LEHMAN

Attesting Officer     Commissioner of Patents and Trademarks